United States Patent [19]
Steffen

[11] 3,884,329
[45] May 20, 1975

[54] SPEEDOMETER CABLE LUBRICATING DEVICE

[76] Inventor: Henry W. Steffen, P.O. Box 246, Morton, Minn. 56270

[22] Filed: Sept. 10, 1973

[21] Appl. No.: 395,737

[52] U.S. Cl. ............ 184/1 R; 184/105 R; 184/15 R
[51] Int. Cl. .......................... F16n 1/00; F16n 21/00
[58] Field of Search ........ 184/1 R, 14, 15 R, 105 R

[56] References Cited
UNITED STATES PATENTS

| | | | |
|---|---|---|---|
| 2,178,058 | 10/1939 | West | 184/1 R |
| 2,681,711 | 6/1954 | Sievenpiper | 184/105 R |
| 3,283,854 | 11/1966 | Self | 184/105 R |

FOREIGN PATENTS OR APPLICATIONS

| | | | |
|---|---|---|---|
| 752,865 | 7/1956 | United Kingdom | 184/105 R |

*Primary Examiner*—Manuel A. Antonakas
*Attorney, Agent, or Firm*—L. Paul Burd

[57] ABSTRACT

A device for lubricating speedometer cables of automotive vehicles which includes a source of lubricating fluid under pressure, such as a pressure oil can, grease gun, or the like, characterized by having a fitting adapted to enter into sealing engagement with the bottom end of the speedometer cable housing remote from the speedometer. The lubricator fitting is adapted to engage the several different types of speedometer cable housing fittings presently in use on most American-made automobiles. The speedometer cable lubricator solves the problem of lubricating speedometer cables created by the difficulty of access to the cable housing at the upper or speedometer end of the cable.

8 Claims, 6 Drawing Figures

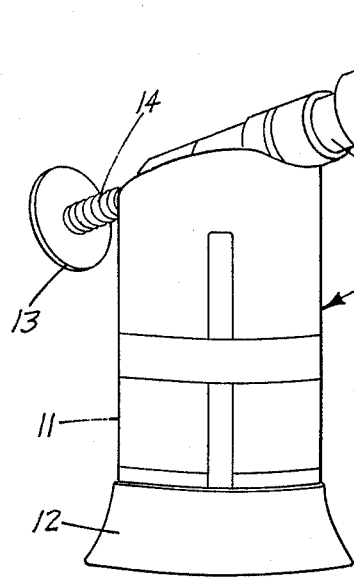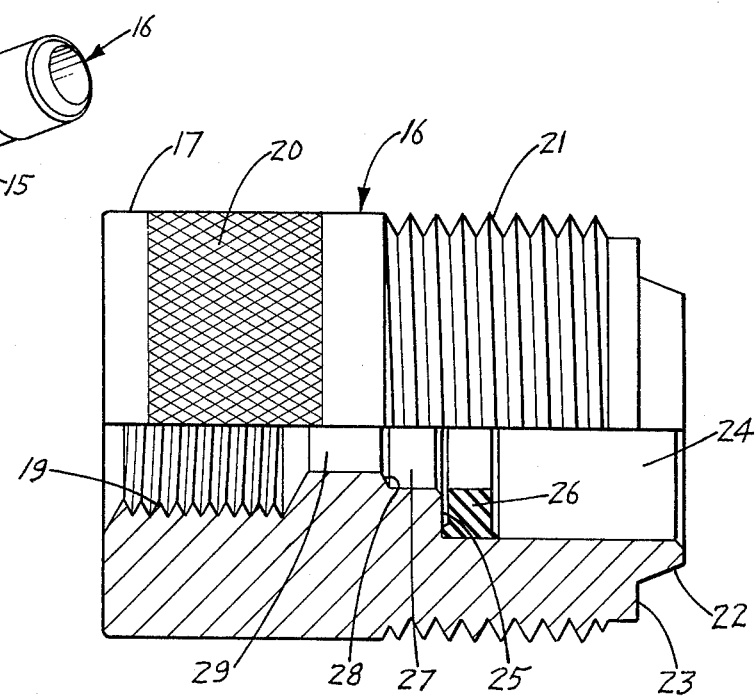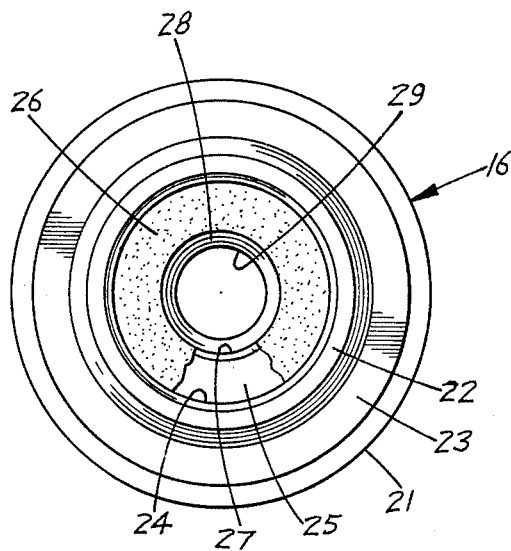

SPEEDOMETER CABLE LUBRICATING DEVICE

This invention relates to a speedometer cable lubricating device especially designed for lubricating speedometer cables of automotive vehicles at the bottom end where the cable connects to the automotive transmission.

Speedometer cables are elongated flexible shafts enclosed within a flexible housing provided with a fitting at the upper end for attachment to the speedometer and a fitting at the lower end adapted for connection to the automatic transmission. The housing is packed with a lubricant, oil or grease, so that the cable may rotate smoothly and quietly within the flexible housing.

When, for one reason or another, the speedometer cable housing loses all or part of its lubricant, this fact is made known by the squeaking sound caused by relative movement between the cable and unlubricated inside wall surface of the housing. Lack of lubrication also is often manifested by jerking or jumping of the speedometer needle due to irregular rotation of the cable.

It has in the past been common practice to lubricate the speedometer cable by disconnection of the upper end of the cable housing from the speedometer and application of lubricant from the top. As automobiles have become more and more complex, this task has become more difficult. Because of the nearly inaccessible location of the connection of the speedometer cable to the speedometer on the back side of the dashboard of the automotive vehicle, what should be a relatively simple and inexpensive lubricating task has become a difficult operation. At the same time, few noises are more irritating or nerve-wracking than the persistent squeak of an inadequately lubricated speedometer cable.

By means of the present invention, the speedometer cable may be lubricated from the bottom up simply by disconnecting the speedometer cable housing from the automotive transmission, which is easily accessible, and engaging it with a pressure lubricator fitted with a special nozzle adapted for engagement with the speedometer cable housing fittings. However, a further problem is presented in that the speedometer cable housings currently in use in automotive vehicles employ a variety of different connecting fittings to the transmission depending upon the particular make and model of automotive vehicle. The nozzle fitting of the speedometer cable lubricator according to the present invention is so constructed as to be especially adapted to engage in sealing relationship the connecting fitting between the speedometer cable housing and transmission of most American made automotive vehicles in use at the present time.

The invention is illustrated in the accompanying drawings in which corresponding parts are identified by the same numerals and in which:

FIG. 1 is a perspective view of one form of speedometer cable lubricator according to the present invention;

FIG. 2 is an enlarged view, partly in side elevation and partly in section, showing details of design and construction of the lubricator adapter nozzle according to the present invention;

FIG. 3 is an end elevation thereof;

Figure 4:
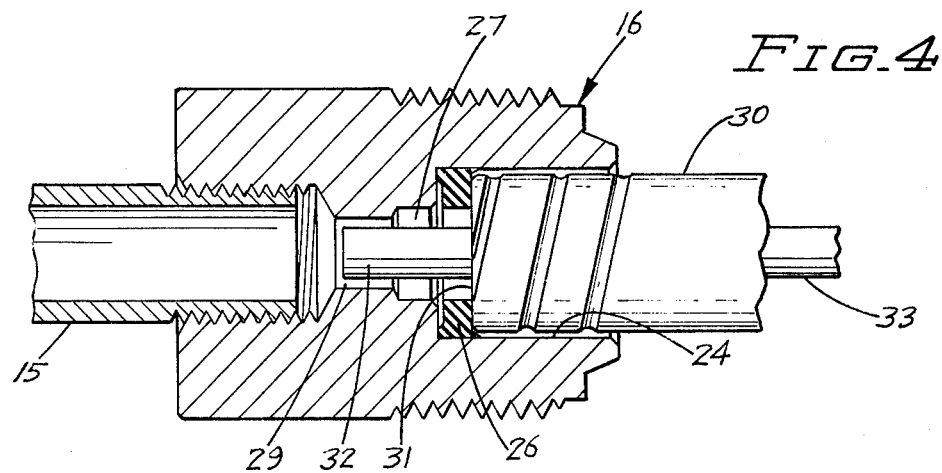
FIG. 4 is a schematic view showing the adapter nozzle in section and one form of speedometer cable housing fitting in sealing engagement therewith.

Referring now to the drawings, there is shown in FIG. 1 one exemplary form of pressure lubricating device for lubricating speedometer cables according to the present invention. A pressure oil can of well-known and readily available type, indicated generally at 10, comprises a housing 11 adapted to receive lubricating oil and to serve as a handle for ease in application of lubricant. In this instance, the closure of the housing is in the form of a screw-on cap 12 which also functions as a base for the lubricating device. As is well understood, this pressure oil can type lubricator includes a pushbutton actuator 13 at the end of a spring biased actuator rod 14 which, upon reciprocation, by pumping action causes lubricant to be delivered under pressure to a discharge fitting 15 to which is attached a lubricator adapter fitting, indicated generally at 16.

Although the invention is illustrated by means of one exemplary form of pressure oil can, other types of pressure oil can are known and may be utilized in the practice of this invention. Additionally, any of the variety of wellknown and readily availabile grease guns may be used or the invention may be practiced using the more sophisticated pressure lubrication systems commonly found in vehicle distributorships, well equipped garages, filling stations, and the like.

Referring now to FIGS. 2 and 3, the lubricator nozzle fitting 16 comprises a generally cylindrical body 17 having a central longitudinal passage therethrough. The upstream end of the longitudinal passage is provided with a plurality of internal threads 19 to facilitate connection of the nozzle fitting 16 to the discharge end of a pressure lubricating device. The upstream end of the outer surface of the body is knurled at 20 to facilitate attachment of the nozzle fitting to the lubricating device. The opposite end of body 17 is externally threaded at 21 to facilitate attachment to certain types of speedometer cable housings, as explained in greater detail hereinafter.

The downstream face of fitting 16 is provided with an annular tapered ring 22 surrounding the central passage and projecting from the downstream face or shoulder 23. The downstream end of the central passage is a deep recess 24 of circular cross section terminating in a shoulder 25 on which is seated a resilient gasket or washer 26. The longitudinal central passage is restricted to provide a further shallower recess 27 of circular cross section, of the same diameter as the bore of washer 26, at the upstream end of which is a narrow shoulder 28. The longitudinal passage is further constricted at 29 into a short passage of circular cross section communicating with the internally threaded portion 19. The manner in which the speedometer cable lubricating device of the present invention is used is illustrated in FIGS. 4 through 6.

FIG. 4 shows generally one type of bottom end fitting commonly used for speedometer cable housings in some Ford Motor Company and some Chrysler Corporation cars. This cylindrical fitting 30 is of a size to engage recess 24 of nozzle fitting 16 with a slide fit. It has a flat end 31 which is adapted to seat against the face of resilient washer 26. The free end 32 of cable 33 projects from the end of fitting 30 through the bore of washer 26 into recess 27, and constricted passage 29 depending upon its length, but with ample room for passage of lubricant around the outside of the cable end.

To lubricate a cable whose housing has this cylindrical type of end fitting 30, the fitting is held with its flat end 31 in tight sealing engagement against resilient washer 26 while lubricant under pressure is forced from discharge conduit 15 through the longitudinal passage protions 19, 29 and 27 into the end of the fitting and thence between the cable and cable housing until a substantial length of the housing is filled with lubricant sufficient to maintain the speedometer cable in desired lubricated condition. Fitting 30 is then withdrawn from the adapter 16 and reinserted into the clip by which it is connected to the vehicle transmission.

Figure 5:
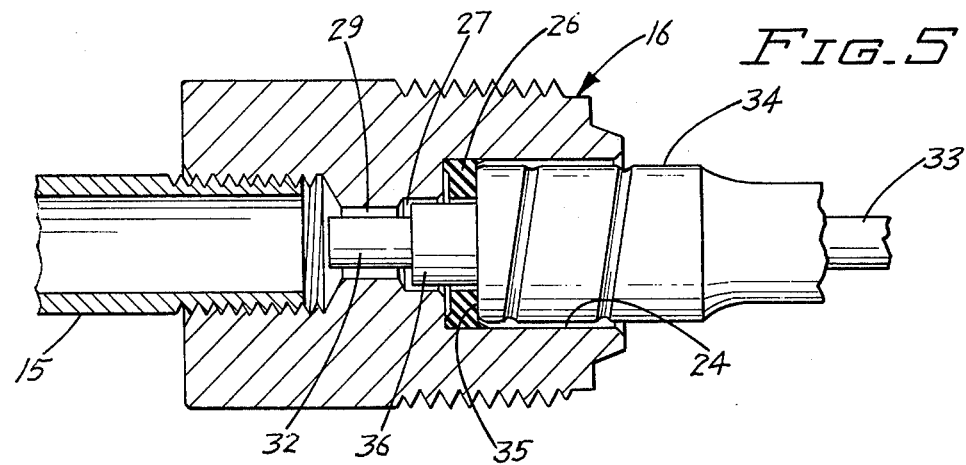
FIG. 5 is a similar view showing the means of sealing engagement with another common type of speedometer cable housing fitting.
Figure 6:
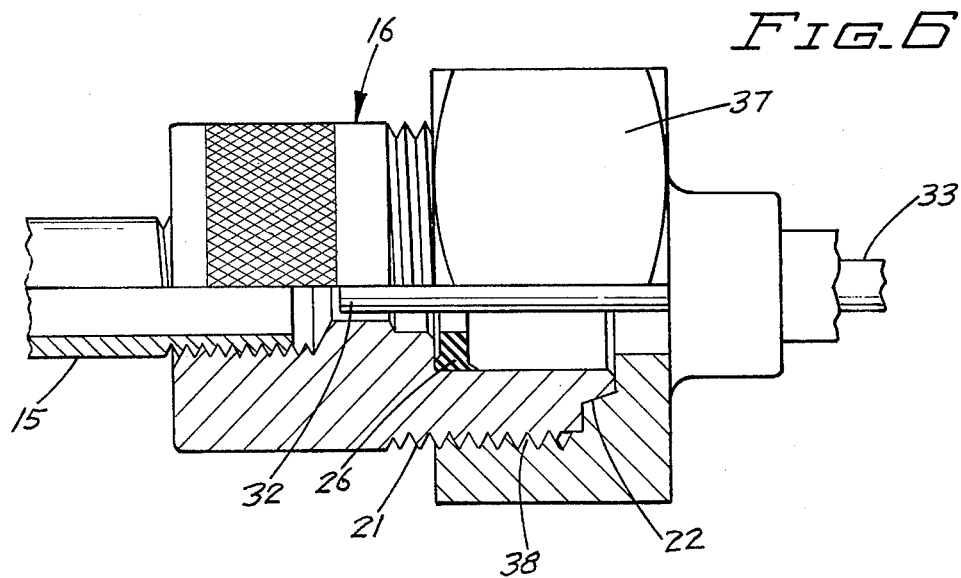
FIG. 6 is a similar view, partly in side elevation and partly in section, showing the means of sealing engagement with a still further common type of speedometer cable housing fitting.

FIG. 5 shows a slightly modified form of cable housing fitting 34 which in addition to having a flat end 35 has a projecting tip 36 of circular cross section through which the end 32 of cable 33 extends. A speedometer cable whose housing has this type of bottom end fitting is similarly lubricated by inserting the fitting 34 into recess 24 until the end face 35 seats in sealing engagement with washer 26. The fitting tip 36 extends through the center of the sealing gasket into recess 27 of the longitudinal passage with the end 32 of the cable extending into the constricted passage 29. This type of speedometer housing fitting likewise connects to the transmission through a clip structure and is lubricated in the same manner. This type of fitting is used on some Ford Motor Company and some General Motors cars.

FIG. 6 shows a still further type of speedometer cable housing fitting 37 in the form of a cap 37 internally threaded at 38 and adapted to engage external threads 21 of adapter 16. Ring 22 of the adapter seats in sealing engagement against the inner surfaces of cap 37. Cable end 32 extends freely through the longitudinal passage of adapter 16. Although shown in hexagonal form as used on some Chrysler Corporation cars, cap fittings of circular cross section are also in common use as bottom fittings of speedometer cable housings on some General Motors cars. These are adapted to be used in the same manner.

It will be seen that because of the versatility of the adapter nozzle 16, the speedometer cable lubricator according to the present invention may be used to lubricate from the bottom end all of those speedometer cables whose bottom end housings are of one of the four common types, namely cylindrical with flat end, cylindrical with projecting tip, hexagonal cap and circular cap. Because the adapter 16 is made to fit preexisting equipment, it has the following exemplary dimensions: the external dimension of threads 21 is 0.780 inch in diameter ±0.005; recess 24 is 0.440–0.445 inch in diameter and about ½ inch or more deep; recess 27 is 0.255–0.260 inch in diameter and should be at least about 3/16 inch deep. The internally threaded portion of the longitudinal passage fits a three-eighths inch externally threaded discharge duct of preexisting pressurized lubricating equipment. Constricted passage 29 is optional but, if present, should be of about three-sixteenths inch in diameter to permit ample room around the end 32 of the speedometer cable to permit passage of the lubricant. The overall length of fitting 16 is not critical but about 1¼ inch has been found to be a convenient size.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A nozzle fitting for a pressure lubricating device adapting said device to the lubrication of automotive vehicle speedometer cables, said fitting comprising:
  A. a generally cylindrical body;
  B. a central longitudinal passage through said body;
  C. the upstream end of said passage being internally threaded, whereby said fitting is adapted for attachment to a lubricating device;
  D. the opposite downstream end of said passage being a first recess of circular cross section, whereby the nozzle fitting is adapted to receive therein with a slide fit the bottom end fitting of one form of speedometer cable housing;
  E. an annular shoulder at the upstream end of said first recess;
  F. a sealing gasket having a central opening therein and seated on said shoulder;
  G. a further recess of circular cross section disposed immediately upstream from said first named recess and in direct fluid communication therewith, the diameter of said further recess corresponding generally to the diameter of the opening in said sealing gasket;
  H. an annular ring surrounding said first recess and projecting from the downstream end of said body; and
  I. the end of said cylindrical body adjacent to said annular ring being externally threaded, whereby the nozzle fitting is adapted to engage the internally threaded bottom end fitting of another form of speedometer cable housing.

2. A nozzle fitting according to claim 1 further characterized in that:
  A. said further recess includes an annular shoulder at its upstream end; and
  B. said further recess is connected to the upstream internally threaded end of the longitudinal passage through a constricted passage of diameter less than the diameters of said further recess and internally threaded passage end.

3. A nozzle fitting according to claim 1 further characterized in that:
  A. said externally threaded end of said body is between about 0.775 and 0.785 inch in diameter; and
  B. said first recess is between about 0.440 and 0.445 inch in diameter.

4. A nozzle fitting according to claim 3 further characterized in that:
  A. the central opening of said sealing gasket is at least about 0.255 to 0.260 inch in diameter; and
  B. said first recess is at least about ½ inch deep.

5. A nozzle fitting according to claim 1 further characterized in that:
  A. said further recess is between about 0.255 to 0.260 inch in diameter, and
  B. said further recess is at least about 3/16 inch deep.

6. A nozzle fitting according to claim 1 further characterized in that:
   A. said externally threaded end of said body is between about 0.775 and 0.785 inch in diameter;
   B. said first recess is between about 0.440 and 0.445 inch in diameter and at least about ½ inch deep;
   C. said further recess of circular cross section is between about 0.255 and 0.260 inch in diameter and at least about 3/16 inch deep; and
   D. the central opening of said sealing gasket is at least equal in diameter to said further recess.

7. A device for the lubrication of automotive vehicle speedometer cables comprising in combination:
   A. a pressure lubricating device adapted to discharge lubricating fluid under pressure and having an externally threaded discharge fitting; and
   B. a nozzle fitting attached to said discharge fitting adapting said pressure lubricating device to the lubrication of automotive vehicle speedometer cables, said nozzle fitting comprising:
      1. a generally cylindrical body;
      2. a central longitudinal passage through said body;
      3. the upstream end of said passage being internally threaded and in engagement with the externally threaded discharge fitting of said lubricating device;
      4. the opposite downstream end of said passage being a first recess of circular cross section, whereby the nozzle fitting is adapted to receive therein with a slide fit the bottom end fitting of one form of speedometer cable housing;
      5. an annular shoulder at the upstream end of said first recess;
      6. a sealing gasket having a central opening therein and seated on said shoulder;
      7. a further recess of circular cross section disposed immediately upstream from said first named recess and in direct fluid communication therewith, the diameter of said further recess corresponding generally to the diameter of the opening in said sealing gasket;
      8. an annular ring surrounding said first recess and projecting from the downstream end of said body; and
      9. the end of said cylindrical body adjacent to said annular ring being externally threaded, whereby the nozzle fitting is adapted to engage the internally threaded bottom end fitting of another form of speedometer cable housing.

8. A device according to claim 7 further characterized in that:
   A. said externally threaded end of said nozzle fitting body is between about 0.775 and 0.785 inch in diameter;
   B. said internally threaded end of said longitudinal passage and discharge fitting of the pressure lubricating device are about ⅜ inch in diameter;
   C. said first recess is between about 0.440 and 0.445 inch in diameter and at least about ½ inch deep;
   D. said further recess of circular cross section is between about 0.255 and 0.260 inch in diameter and at least about 3/16 inch deep; and
   E. The central opening of said sealing gasket is at least equal in diameter to said further recess.

* * * * *

UNITED STATES PATENT OFFICE
CERTIFICATE OF CORRECTION

PATENT NO. : 3,884,329
DATED : May 20, 1975
INVENTOR(S) : Henry W. Steffen

It is certified that error appears in the above-identified patent and that said Letters Patent are hereby corrected as shown below:

Column 1, line 11, "automatic" should be --automotive--.

Column 3, line 9, "againist" should be --against--;

line 12, "protions" should be --portions--.

Signed and sealed this 15th day of July 1975.

(SEAL)
Attest:

RUTH C. MASON
Attesting Officer

C. MARSHALL DANN
Commissioner of Patents
and Trademarks